(12) United States Patent
Hata

(10) Patent No.: US 7,201,592 B2
(45) Date of Patent: Apr. 10, 2007

(54) WIRE COVER AND CONNECTOR PROVIDED THEREWITH

(75) Inventor: Takao Hata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/875,367

(22) Filed: Jun. 24, 2004

(65) Prior Publication Data

US 2005/0003698 A1    Jan. 6, 2005

(30) Foreign Application Priority Data

Jun. 24, 2003  (JP)  ............................. 2003-179517

(51) Int. Cl.
*H01R 4/64*  (2006.01)
(52) U.S. Cl. ...................... 439/206; 439/470
(58) Field of Classification Search ................ 439/470, 439/190, 205, 206, 445, 194, 195, 192
See application file for complete search history.

(56) References Cited

U.S. PATENT DOCUMENTS

| 5,908,327 | A | * | 6/1999 | Tsuji et al. | .................. 439/470 |
| 5,967,830 | A | * | 10/1999 | Tsuji | ........................... 439/470 |
| 6,048,072 | A | * | 4/2000 | Yen | ............................. 439/190 |
| 6,203,362 | B1 | | 3/2001 | Tsuji | |

\* cited by examiner

*Primary Examiner*—Felix O. Figueroa
(74) *Attorney, Agent, or Firm*—Gerald E. Hespos; Anthony J. Casella

(57) ABSTRACT

A wire cover (10) is provided with a wall (WL) for surrounding wires drawn out from a connector (40), and water-draining holes (20A) penetrate the wall surface (WL) in a nonlinear manner. An inner surface (25a) forming a bent portion (23) of each water-draining hole (20A) is formed into a slanted surface inclined toward an outer side of the wall (WL) as it extends from a connecting portion (25b) with a communication hole (22) at an inner side of the wall (WL) toward a connecting portion (25c) with a communication hole (21) at the outer side of the wall (WL).

20 Claims, 8 Drawing Sheets

WIRE COVER AND CONNECTOR PROVIDED THEREWITH

BACKGROUND OF THE INVENTION

1. Field of the Invention

The invention relates to a wire cover for accommodating wires connected with terminal fittings and to a connector with such wire cover.

2. Description of the Related Art

U.S. Pat. No. 6,203,362 discloses a wire cover with a water-draining hole at a bottom side of the wire cover for draining water that has entered the inside. The wire cover is formed by engaging two half pieces that are coupled by a hinge. The hinge covers water-draining hole to prevent the water-draining hole from being exposed directly to the outside.

The above-described wire cover requires the hinge to be at the bottom side of the wire cover, thereby limiting the design options for the wire cover. Furthermore, the above-described technology requires an additional structure to cover the water-draining hole if the wire cover has no hinge.

The present invention was developed in view of the above problem, and an object is to prevent entry of water from the outside into a wire cover.

SUMMARY OF THE INVENTION

The invention relates to a wire cover with a wall for at least partly surrounding wires drawn out from a connector. At least one water-draining hole penetrates the wall in a bent or inclined manner. The bent or inclined water-draining hole enables water in the wire cover to drain. Additionally, the bent or inclined water-draining hole makes it difficult for water to enter the wire cover even if the opening of the water-draining hole is exposed to water.

An inner surface of an intermediate portion of the water-draining hole preferably inclines towards an outer side of the wall as it extends from a connection with an inner side of the wall towards a connection with the outer side of the wall. Thus, a minimum width of the water-draining hole can be widened and surface tension will not hinder the draining of water to the outside.

At least one rib preferably is provided at least partly around an opening of the water-draining hole to an outer side of the wall. The rib intersects a straight line passing through the water-draining hole and connecting the opening to the outer side of the wall and an opening to an inner of the wall surface. Thus, a range of angles at which water directly enters the inside via the water-draining hole is narrowed, thereby reducing the entrance of water to the inside.

The wire cover preferably comprises two housings connected with each other. The two housings preferably are substantially identical. Accordingly, the number of different pieces can be reduced, thus reducing the overall costs.

The cover housings preferably are connected with each other by connecting means on the cover housings. The connecting means preferably comprises at least one engaging piece engageable with an engaging projection being preferably rounded. The engaging projection preferably is rounded to reduce the connection friction and thus to improve overall operability.

The invention also relates to a connector comprising the above-described wire cover fitted to the connector for at least partly surrounding one or more wires drawn out from the connector.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
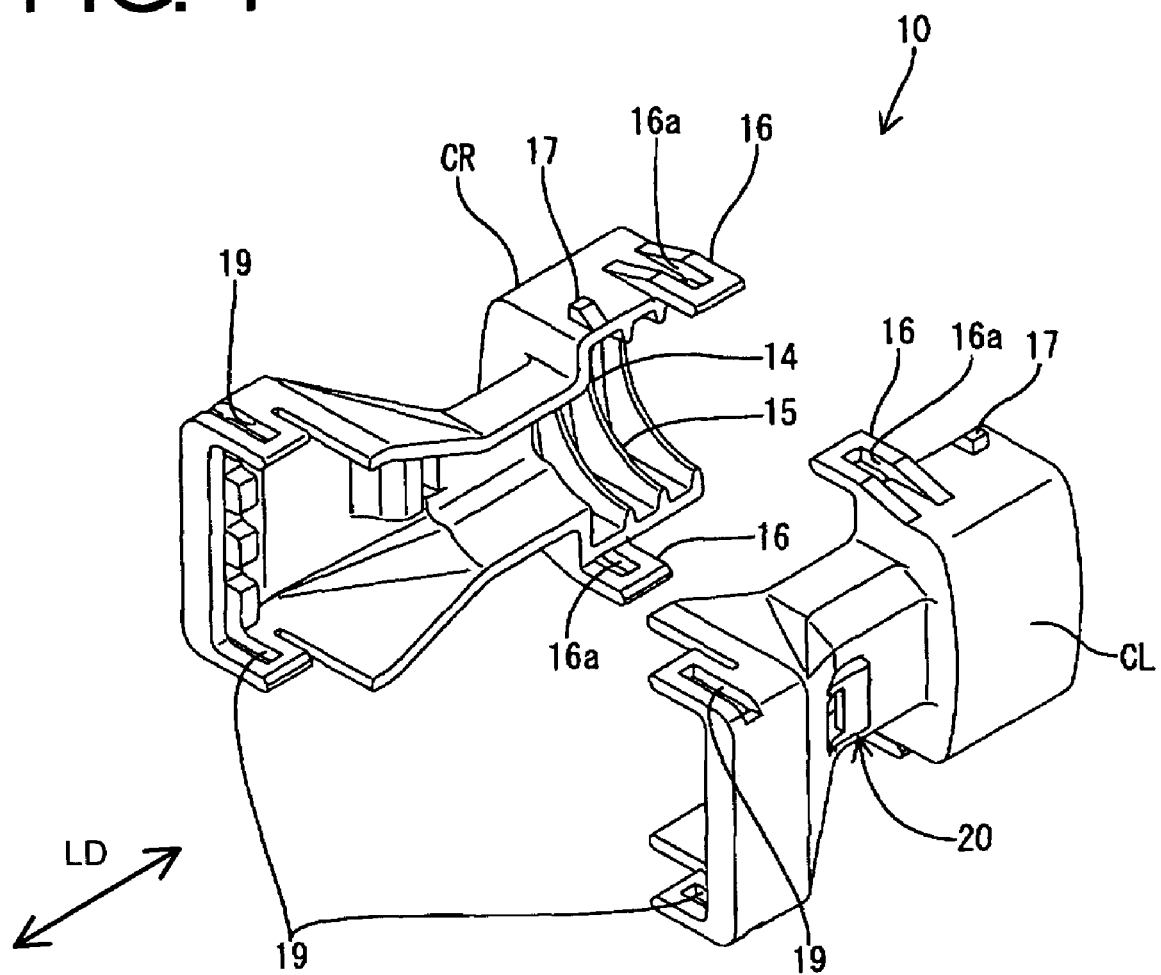
FIG. 1 is an exploded perspective view of cover housings forming a wire cover according to the invention.
Figure 2:
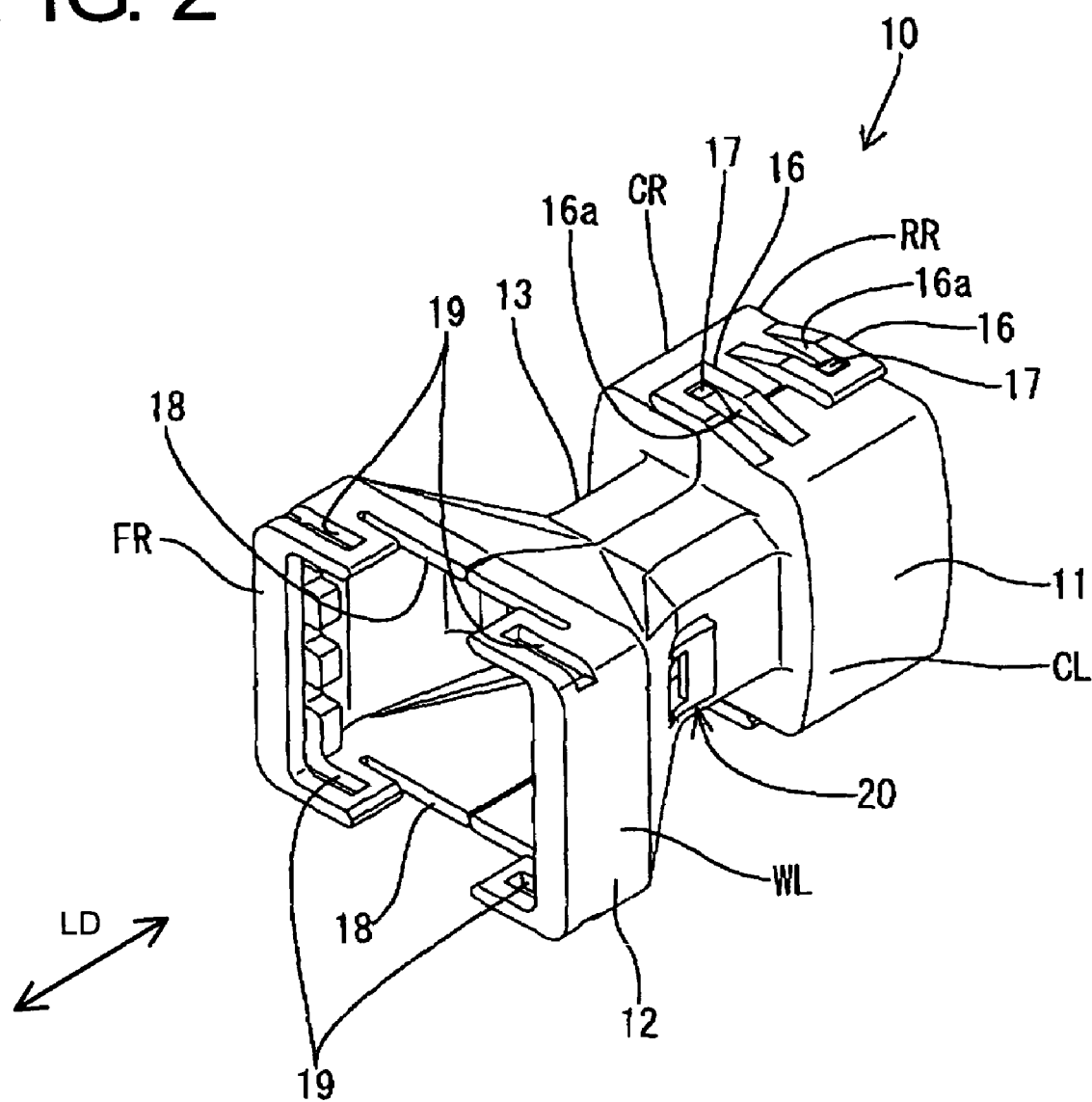
FIG. 2 is a perspective view of the inventive wire cover.

A wire cover according to a first embodiment of the invention is identified by the numeral 10 in FIGS. 1 to 4. In the following description, a mating side of the wire cover 10 with a connector 40 is referred to as the front. As shown in FIG. 1, the wire cover 10 is comprised of two cover housings CR, CL, each of which is made unitarily of a synthetic resin. Additionally, the two cover housings 10 have identical shapes. The wire cover 10 is assembled by positioning the cover housings CR, CL opposite each other and engaging the cover housings CR, CL together. As a result, walls WL extend substantially in a longitudinal direction LD and front and rear ends FR, RR are open as shown in FIG. 2. The wire cover 10 is engaged with a connector 40, so that the walls WL at least partly surround the connector 40 and wires (not shown) drawn out from the connector 40.

Figure 3:
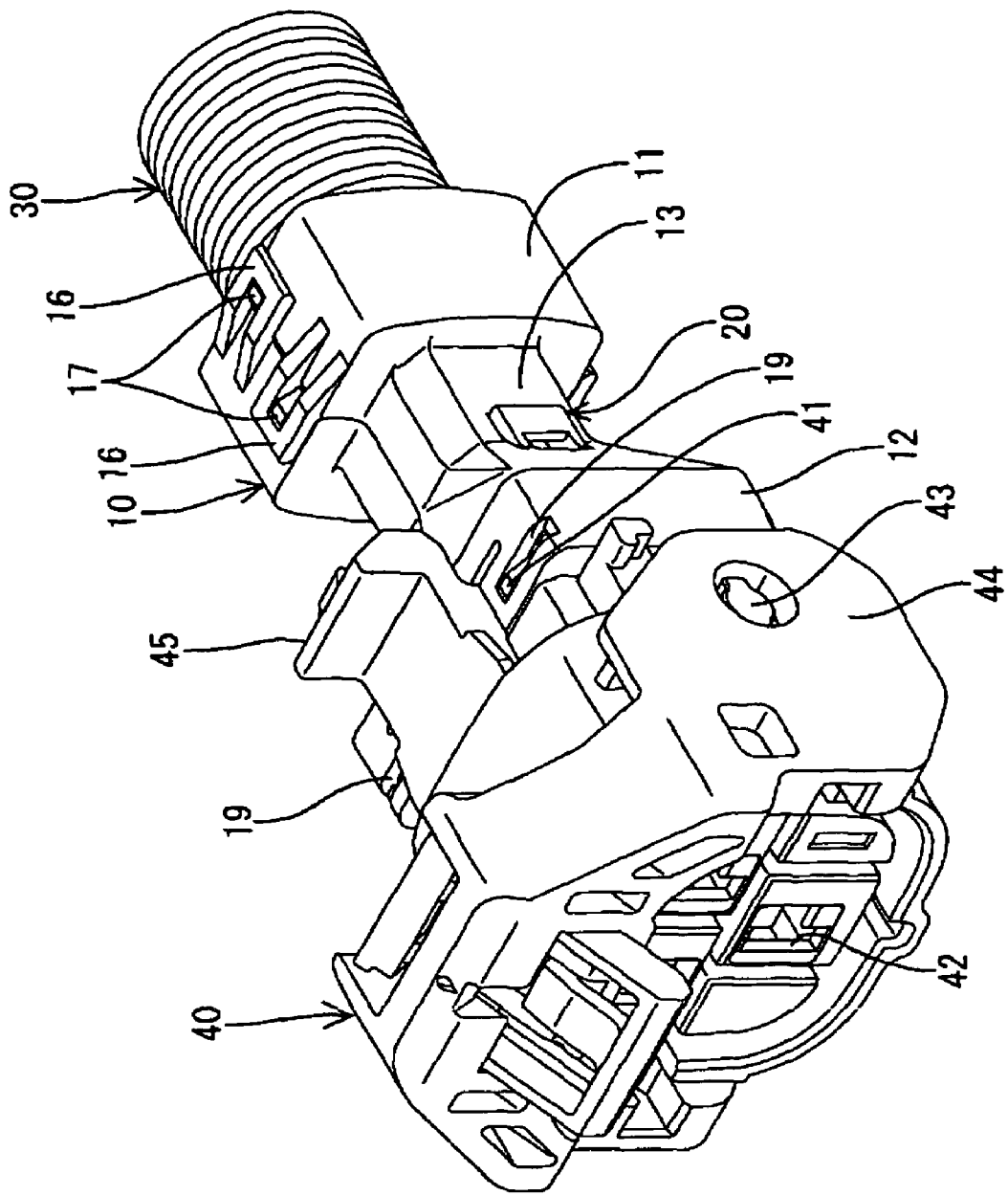
FIG. 3 is a perspective view showing a state where the inventive wire cover is mounted on a corrugate tube and a connector.

The wire cover 10 has a tube holding portion 11 at a rear end, a connector-coupling portion 12 at a front end, and an intermediate portion 13 that connects the tube holding portion 11 and the connector coupling portion 12. Holding grooves 14 and projections 15 are formed on the inner surface of the tube holding portion 11 so that a wire-protecting member comprising a corrugate tube 30 can be held as shown in FIG. 3.

Engaging pieces 16 are formed on outer edges of the tube holding portion 11 of each cover housing CR, CL and face each other when the cover housings CR, CL are opposed to each other. Two engaging pieces 16 are offset along the longitudinal direction LD on the outer peripheral surface of each cover housing CR, CL, and two engaging projections 17 are formed adjacent to the engaging pieces in an offset manner on the outer peripheral surface of each cover housing CR, CL.

Substantially rectangular notches 18 are formed on upper and lower surfaces of a front edge of the connector-coupling portion 12 (see FIG. 2). Further, coupling holes 19 are formed on the four corners of the outer surface of the connector-coupling portion 12 and engage coupling projections 41 of the connector 40 shown in FIG. 3. The connector 40 is coupled to the wire cover 10 by engaging the coupling projections 41 with the coupling holes 19. Cavities 42 are formed at a front side of the connector 40 for accommodating unillustrated terminals, and a lever 44 is engaged rotatably with shafts of rotation 43 (only one is shown in FIG. 3) on opposite outer side surfaces.

A locking piece 45 projects on the upper surface of the connector 40 and is engageable with the notch 18 in the connector-coupling portion 12. The locking piece 45 engages the pivoted lever 44 to hold the connector 40 connected with the mating connector.

The wires are connected with the terminals and are introduced through the corrugate tube 30. The terminals then are inserted in the cavities 42 of the connector 40. Thereafter, the engaging pieces 16 and the respective engaging projections 17 on the cover housings CR, CL are engaged to engage the cover housings CR, CL with each other while the corrugate tube 30 is held tightly. Additionally, the coupling projections 41 of the connector 40 are fit into the coupling holes 19 of the connector-coupling portion 12. In this way, the wire cover 10, the corrugate tube 30 and the connector 40 are coupled.

Figure 4:
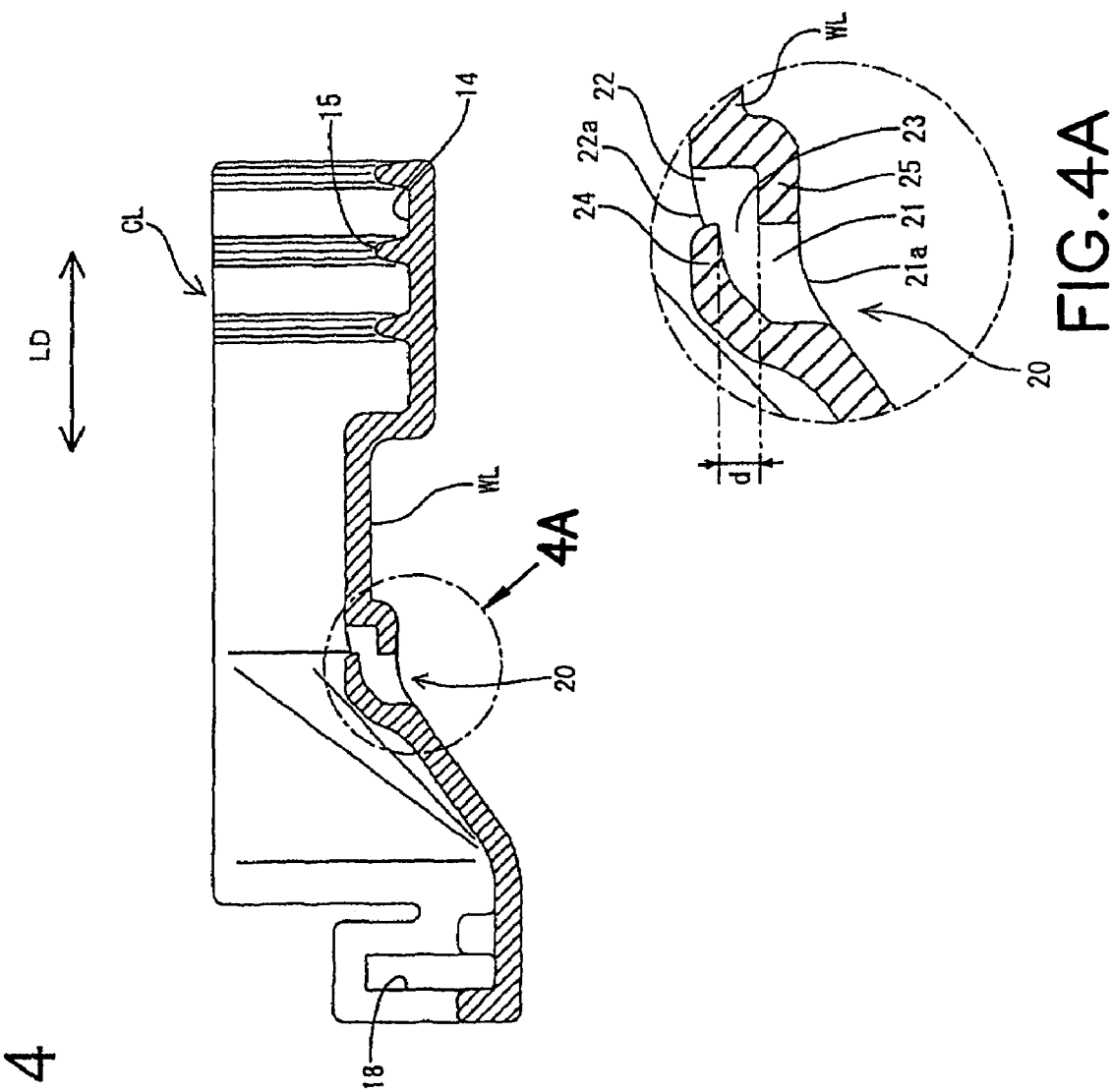
FIG. 4 is a section showing a water-draining hole according to a first embodiment.

The cover housings CL, CR have similar water drain holes 20. For simplicity, only the water-draining hole 20 in the cover housing CL is described. As shown in FIG. 4, the water-draining hole 20 penetrates the wall WL and has a nonlinear configuration. More particularly, the water-draining hole 20 has a communication hole 21 that communicates with an outer side of the wall WL and a communication hole 22 that communicates with an inner side of the wall WL. A bent portion 23 is connected with the communication holes 21, 22 and extends substantially in the longitudinal direction LD of the cover housing CL.

The communication hole 21 has a substantially rectangular cross section, and a side of the communication hole 21 opposite from an opening 21a to the outer side of the wall WL is closed partly by a projecting piece 24 that projects towards the inner side of the wall WL. On the other hand, the communication hole 22 also has a substantially rectangular cross section, and a side thereof opposite from an opening 22a to the inner side of the wall WL is closed partly by a projecting piece 25 projecting toward the outer side of the wall WL. The bent portion 23 also has a substantially rectangular cross section. The communication holes 21 and 22 are offset from one another along the longitudinal direction LD and do not overlap along the longitudinal direction LD. Thus, there is no direct hole normal to the longitudinal direction LD. The communication holes 21 and 22 are spaced along the longitudinal direction LD by more than their maximum extension along the direction LD. Accordingly, the water-draining hole 20 has a bent configuration, in which the intermediate bent portion 23 is not perpendicular to the longitudinal direction LD.

According to the first embodiment, the water-draining holes 20 penetrate the walls WL in a non-straight manner with at least one bent portion. Thus, water that has entered the wire cover 10 can be drained through the water-draining holes 20. However, the wire cover 10 impedes the entry of water to the inside even if the openings 21a of the water-draining holes 20 are exposed to water, for example, during high-pressure washing, since the water-draining holes 20 are non-straight in a radial direction.

Figure 5:
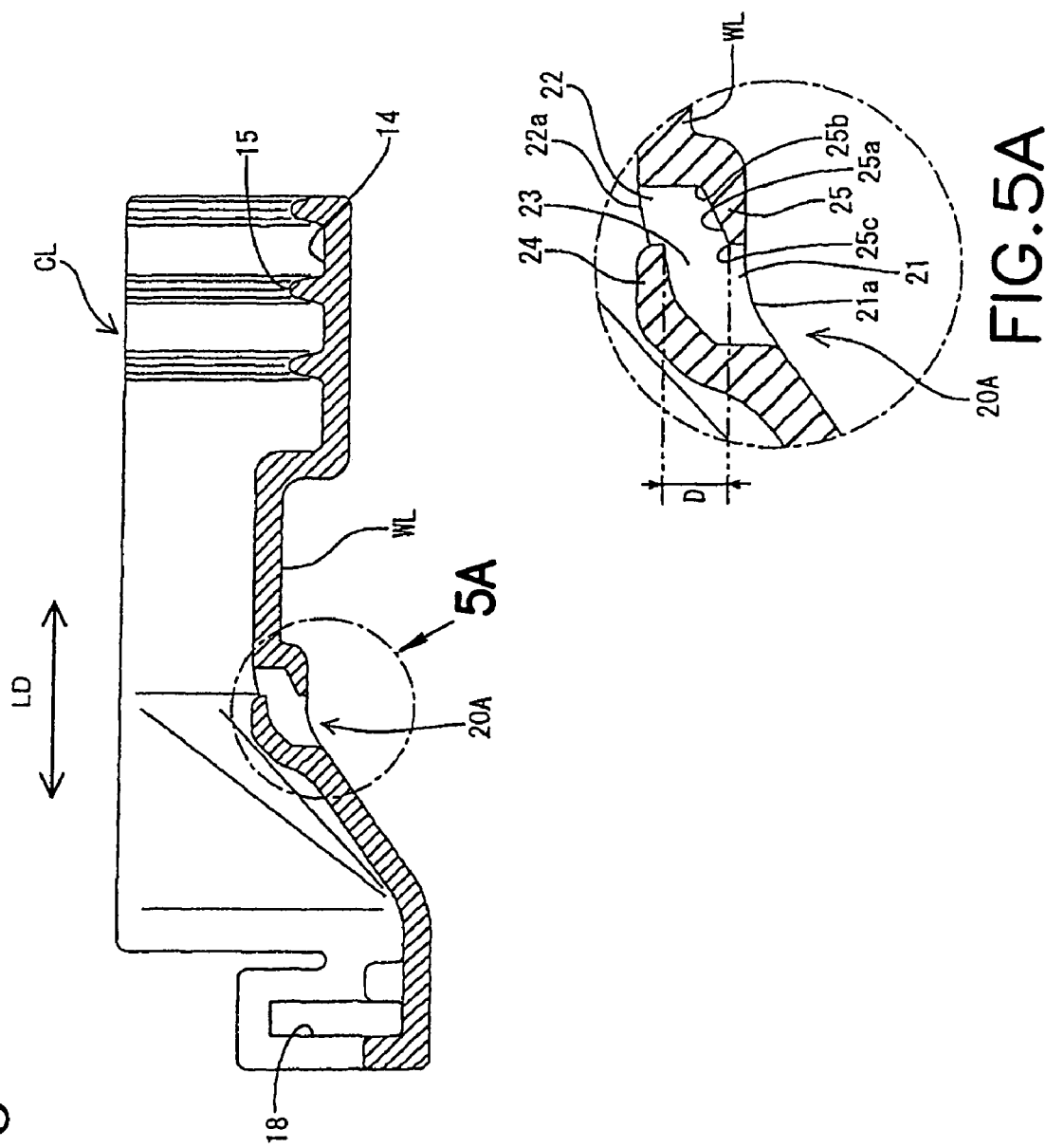
FIG. 5 is a section showing a water-draining hole according to a second embodiment.

A second embodiment of the invention is described with reference to FIG. 5. A water-draining hole 20A of the second embodiment has a projecting piece 25 with an inner surface 25a that projects towards the outer side of the wall WL. The inner surface 25a slants towards the outer side of the wall WL with respect to a longitudinal direction LD as it extends from a connecting portion 25b with the communication hole 22 at the inner side of the wall WL towards a connecting portion 25c with the communication hole 21 at the outer side of the wall WL.

According to this embodiment, the inner surface 25a of the projecting piece 25 diverges toward the outer side with respect to the longitudinal direction LD. Thus, a minimum width D of the water-draining hole 20 is widened without enlarging the entire width W. As a result, surface tension is not likely to form a water film in the water-draining hole 20A. Thus, water can drain to the outside and is not hindered by a water film. Further, the inner surface 25a is slanted. Thus, the minimum width D is widened even though the wall WL is not thinned over a wide area. Thus, the strength of the wall WL is maintained.

The inner surface 25a of the projecting piece 25 slants towards the outer side in this embodiment. However, only the inner surface of the projecting piece 24 that projects towards the inner side of the wall WL may slant towards the outer side of the wall WL as it extends from a connecting portion with the communication hole 22 at the inner side of the wall WL towards a connecting portion with the communication hole 21 at the outer side of the wall WL. Alternatively, the inner surfaces of both projecting pieces 24 and 25 may be slanted to diverge towards the outer side of the wall surface WL.

Figure 6:
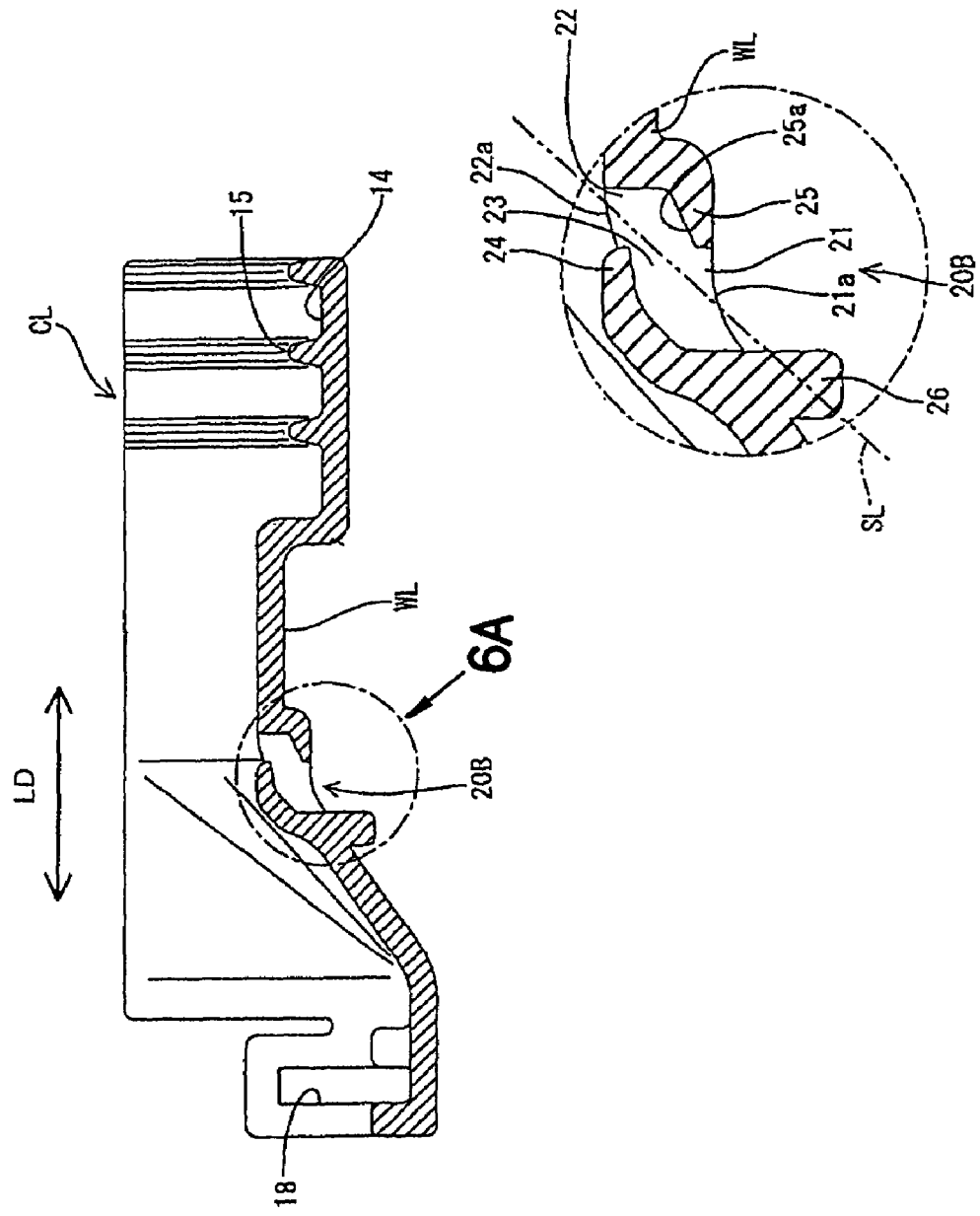
FIG. 6 is a section showing a water-draining hole according to a third embodiment.
Figure 7:
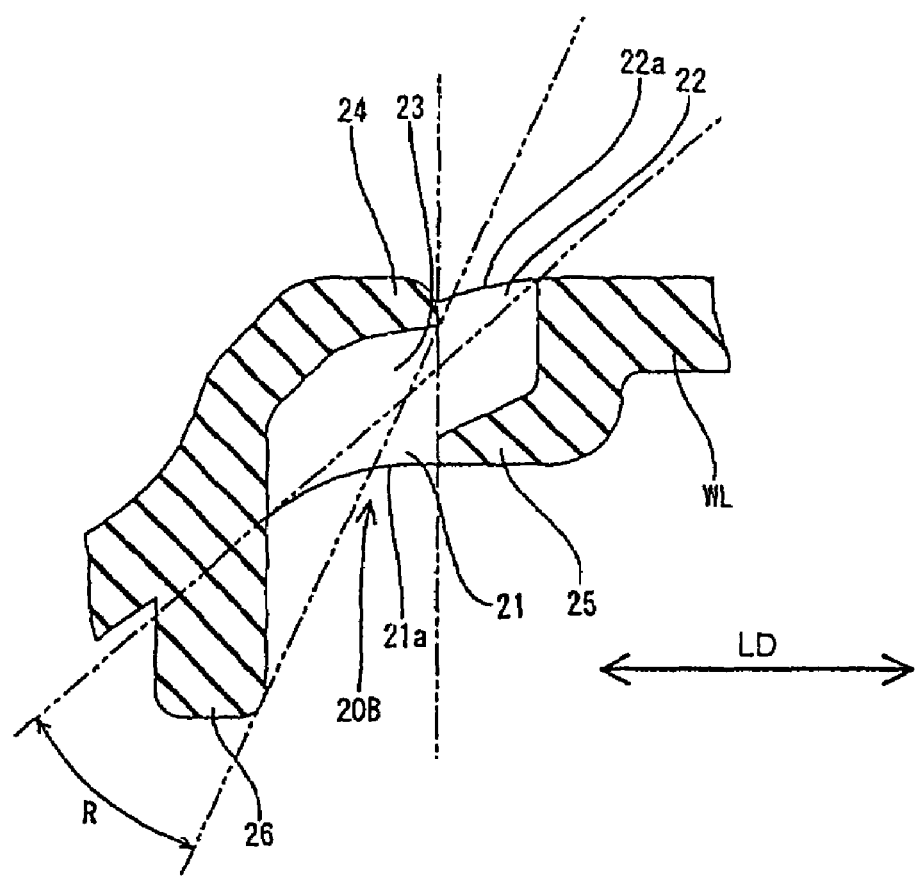
FIG. 7 is a section showing the function and effect of a rib according to the third embodiment.

A third embodiment of the invention is described with reference to FIGS. 6 and 7, and has an outwardly extending rib 26 around at least part of the opening 21a at the outer side of the wall WL. The rib 26 is disposed to intersect an imaginary straight line SL passing through the water-draining hole 20B and connecting the opening 21a to the outer side of the wall WL and the opening 22a to the inner side of the wall WL. Specifically, the rib 26 is at a side around the opening 21a to the outer side of the wall WL and substantially opposite from the communication hole 22 with the inner side of the wall WL with respect to the longitudinal direction LD of the cover housing CL. The inner surface 25a of the projecting piece 25 also is slanted to diverge towards the outer side of the wall WL as in the second embodiment. As shown in FIG. 7, the rib 26 provides a narrow range of angles R at which water directly can enter the inside through the water-draining hole 20B. As a result, the entrance of water to the inside can be reduced.

The engaging pieces 16 and the engaging projections 17 on the cover housings CR, CL shown in FIGS. 1 and 2 are similar to those disclosed in U.S. Pat. No. 6,203,362. With this construction, the engaging piece 16 moves over the slanted surface of the engaging projection 17, and then the engaging projection 17 fits into the engaging hole 16a of the engaging piece 16. The slanted surface of the engaging projection 17 is substantially flat. Thus, the engaging piece 16 and the slanted surface of the engaging projection 17 are held substantially in surface contact as the engaging piece 16 moves over the slanted surface of the engaging projection 17. Thus, a frictional resistance resulting from the relative sliding movements of the engaging piece 16 and the engaging projection 17 becomes large. Reducing the height of the engaging projection 17 can reduce the load attributable to frictional resistance during the engagement. However, this also reduces the holding force when the engagement is completed.

Figure 8:
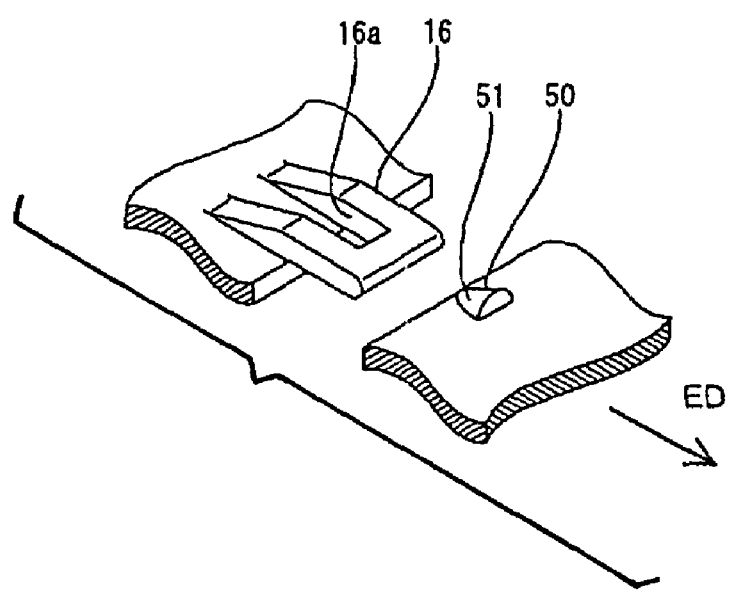
FIG. 8 is a perspective view showing an engaging projection according to a related invention.
Figure 9:
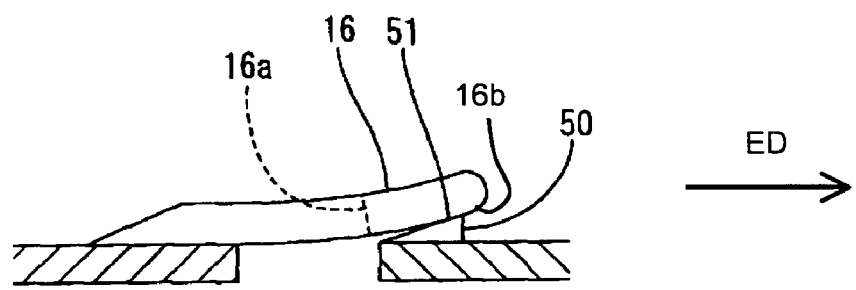
FIG. 9 is a section showing a state where the engaging projection of FIG. 8 is about to be engaged with an engaging piece.
Figure 10:
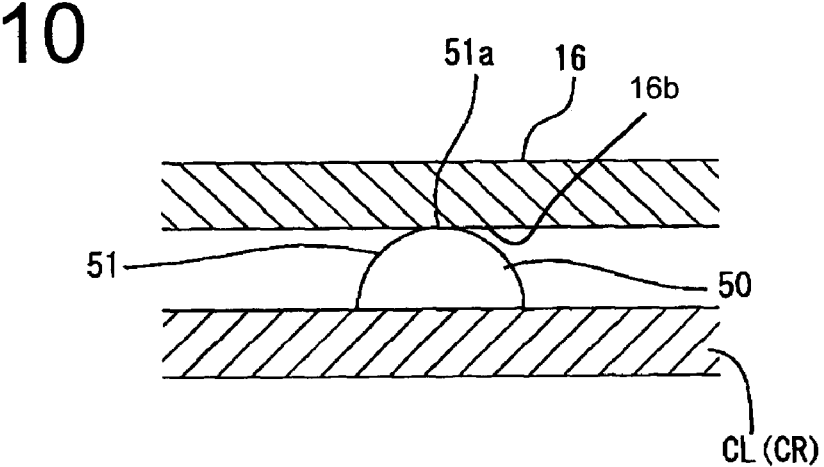
FIG. 10 is an enlarged right side view of FIG. 9.

FIGS. 8 to 10 show alternate engaging projections 50 for facilitating engagement without reducing holding forces. As shown in FIGS. 8 and 10, an outer surface 51 of each engaging projection 50 is curved and has a substantially semicircular cross section along a direction substantially normal to an engaging direction ED. The upper surface 51 has a progressive height so as to be located higher as the engagement progresses. The engaging piece 16 has an engaging surface 16b with a configuration different from the configuration of the upper surface 51 of the engaging projection 51. Preferably the engaging surface 16b of the engaging piece 16 is substantially flat. The engaging pieces 16 move over the corresponding engaging projections 50, and then the engaging projections 50 fit into the engaging holes 16a of the engaging pieces 16. In this way, the engaging pieces 16 and the engaging projections 50 are engaged.

As described above, the engaging pieces 16 first move onto the inclined upper surfaces 51 of the engaging projections 50, as shown in FIGS. 9 and 10. However, the upper surfaces 51 are curved. Thus, the engaging pieces 16 achieve only substantially linear contact with a top portion 51a of the upper surface 51. Accordingly, a contact area of the engaging piece 16 and the engaging projection 50 is reduced remarkably, thereby reducing a frictional resistance as the engaging piece 16 moves over the upper surface 51 of the engaging projection 50. Thus, an engaging force required to engage the engaging piece 16 and the engaging projection 50 is reduced without reducing the height of the engaging projection 50.

Further, since the height of the engaging projections 50 is not reduced, a holding force realized when the engagement of the engaging pieces 16 and the engaging projections 50 is completed can be maintained as before. Furthermore, even if the cover housings CR, CL, are inclined three-dimensionally relative to each during engagement, the engaging pieces 16 and the engaging projections 50 are held constantly substantially in line contact to stabilize the load resistance during engagement due to the curved upper surfaces 51 of the engaging projections 50.

The invention is not limited to the above described and illustrated embodiments. For example, the following embodiments are also embraced by the technical scope of the present invention as defined by the claims. Beside the following embodiments, various changes can be made without departing from the scope and spirit of the present invention as defined by the claims.

The rib 26 may be formed around the opening 21a of the water-draining hole 20 to the outer side of the wall surface WL according to the first embodiment shown in FIG. 4.

The number of the water-draining holes provided in the wire cover is not restricted to two. One, three or more water-draining holes may be provided.

The rib 26 may be formed as a step projecting from e portion of the cover near or at the projecting piece 24.

What is claimed is:

1. A wire cover with a wall at least partly surrounding a connector and at least one wire drawn out in a longitudinal direction from a the connector, the wall having an inner surface facing in towards the wire and an outer surface facing out away from the wire, the wall being formed with an inner communication hole extending out from the inner surface of the wall partly to the outer surface, the inner communication hole having an inner hole peripheral surface intersecting the inner surface of the wall at an inner peripheral edge, an outer communication hole extending in from the outer surface of the wall partly towards the inner surface thereof, the outer communication hole having an outer hole peripheral surface that intersects the outer surface of the wall at an outer peripheral edge, the inner hole peripheral surface and the outer hole peripheral surface each extending substantially normal to the longitudinal direction and being offset from one another along the longitudinal direction, and a bent portion spaced from the inner and outer surfaces of the wall and extending between the inner and outer communication holes so that the inner and outer communication holes and the bent portion define a water draining hole that penetrates the wall in a nonlinear manner.

2. The wire cover of claim 1, wherein at least one rib is provided around an opening of the water-draining hole at the outer surface of the wall and at a position to intersect a straight line passing through the water-draining hole from the inner surface to the outer surface of the wall.

3. The wire cover of claim 1, wherein the wire cover comprises two cover housings connected with each other.

4. The wire cover of claim 3, wherein the two cover housings are substantially identical.

5. The wire cover of claim 3, wherein the cover housings are connected with each other by connecting means on the cover housings.

6. The wire cover of claim 5, wherein the connecting means comprise at least one engaging piece engageable with a rounded engaging projection.

7. A connector assembly, comprising a connector and a wire cover fitted to the connector, the wire cover having a wall for at least partly surrounding at least one wire drawn out in a longitudinal direction from the connector, the wall having an inner surface facing in towards the wire and an outer surface facing out away from the wire, the wall being formed with an inner communication hole extending out from the inner surface of the wall partly to the outer surface, the inner communication hole having an inner hole peripheral surface intersecting the inner surface of the wall at an inner peripheral edge, an outer communication hole extending in from the outer surface of the wall partly towards the inner surface thereof, the outer communication hole having an outer hole peripheral surface intersecting the outer surface of the wall at an outer peripheral edge, the inner and outer wall peripheral surfaces each extending substantially normal to the longitudinal direction and being offset from one another in the longitudinal direction, and an intermediate portion spaced from the inner and outer surfaces of the wall and extending between the inner and outer communication holes so that the inner and outer communication holes and the intermediate portion define a water draining hole that penetrates the wall in a nonlinear manner.

8. The connector assembly of claim 7, wherein the wire cover comprises two cover housings connected with each other and with the connector.

9. The connector assembly of claim 8, wherein the two cover housings are substantially identical.

10. The connector assembly of claim 9, wherein the cover housings are connected with each other by connecting means on the cover housings.

11. The connector assembly of claim 10, wherein the connecting means comprise at least one engaging piece engageable with a rounded engaging projection.

12. The connector assembly of claim 7, wherein the inner communication hole extends substantially normal to the inner surface of the wall.

13. The connector assembly of claim 7, wherein the inner communication hole is offset from the outer communication hole along a longitudinal direction sufficiently so that there is no overlap of the inner and outer communication holes along lines normal to the longitudinal direction.

14. The communication assembly of claim 7, wherein the inner and outer communication holes are offset along a longitudinal direction sufficiently so that there is no direct hole between the inner and outer surfaces normal to the longitudinal direction.

15. The wire cover of claim 1, wherein the inner communication hole extends substantially normal to the inner surface of the wall.

16. The wire cover of claim 1, wherein the inner communication hole is offset from the outer communication hole along a longitudinal direction sufficiently so that there is no overlap of the inner and outer communication holes along lines normal to the longitudinal direction.

17. The wire cover of claim 1, wherein the inner and outer communication holes are offset along a longitudinal direction sufficiently so that there is no direct hole between the inner and outer surfaces normal to the longitudinal direction.

18. A wire cover with a wall at least partly surrounding a connector and at least one wire drawn out from the connector in a longitudinal direction, the wall having an inner surface facing towards the wire and an outer surface facing away from the wire, an inner communication hole extending outwardly from the inner surface to a position between the inner and outer surfaces, the inner communication hole having an inner hole peripheral surface intersecting the inner surface of the wall and aligned substantially normal to the inner surface and normal to the longitudinal direction, an outer communication hole extending inwardly from the outer surface to a position between the inner and outer surfaces, the inner communication hole having an inner hole peripheral surface intersecting the outer surface of the wall at an outer peripheral edge, the inner and outer hole peripheral surfaces being aligned substantially normal to the outer surface and normal to the longitudinal direction, the inner and outer hole peripheral surfaces being offset from one another in the longitudinal direction sufficiently for the inner and outer communication holes to meet between the inner and outer surfaces but without a direct hole extending between the inner and outer surfaces in a direction normal to the longitudinal direction.

19. The wire cover of claim 18, wherein the inner and outer peripheral edges are substantially parallel to one another.

20. The wire cover of claim 18, wherein the inner communication hole has a bottom surface intersecting the inner hole peripheral surface and facing substantially towards an opening on the inner surface of the wall bounded by the inner peripheral edge, the outer communication hole having a bottom surface intersecting the outer hole peripheral surface and facing substantially towards an area bounded by the outer peripheral edge, the bottom surface of the outer communication hole being offset inwardly on the wall from the bottom surface of the outer communication hole.

* * * * *